3,214,333
NEMATICIDES
Frederick Charles Peacock, Bracknell, England, assignor to Imperial Chemical Industries Limited, London, England, a corporation of Great Britain
No Drawing. Filed Mar. 18, 1964, Ser. No. 352,990
8 Claims. (Cl. 167—22)

This invention relates to mixtures of dimethyl(3-methyl-4-nitrophenyl)phosphorothionate and 1,2-dibromo-3-chloropropane and to the use of the mixtures as nematicides.

1,2-dibromo-3-chloropropane is a compound which has found widespread use as a soil nematicide on account of its high nematicide activity and very low phytotoxicity. Dimethyl(3 - methyl-4-nitrophenyl) phosphorothionate, the compound of the formula:

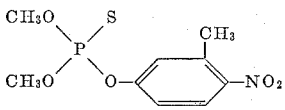

on the other hand, is a compound of value because of its activity as an insecticide, but there has been no disclosure of its having any nematicidal activity.

I have now found according to the present invention that if 1,2-dibromo-3-chloropropane is used in admixture with dimethyl(3 - methyl-4-nitrophenyl)phosphorothionate a greatly enhanced nematicidal activity is obtained, and that the improvement constitutes a synergistic effect. Thus one aspect of this invention comprises new compositions of matter, comprising a mixture of 1,2-dibromo-3-chloropropane and dimethyl(3 - methyl-4-nitrophenyl) phosphorothionate. The ratio by weight of the two ingredients in these mixtures may vary over a fairly wide range for example from 5:1 to 1:5, and very good results have been obtained, as shown in Example I below, by using the ingredients in equal quantities.

The mixture may be converted into formulations to assist in their application. For example they may be used in the form of a powdery or granular composition in which a minor amount of the compound is in admixture with a major amount of a solid diluent.

Suitable diluents include powdered kaolin, fuller's earth, gypsum, chalk, Hewitt's earth, china clay and attaclay. In general the compositions may be applied more conveniently in the form of a liquid preparation which is usually an aqueous dispersion of emulsion containing a surfactant, for example, a wetting or dispersing agent. Whilst water is a preferred liquid diluent organic liquids may also be used. Suitable surfactants include condensation products of ethylene oxide with various substances, for example with alkylated phenols including octyl phenol and nonyl phenol, sorbitan monoclaurate, oleyl alcohol, cetyl alcohol and propylene oxide polymer. Other agents which are also suitable include calcium dodecyl benzene sulphonate, sodium dodecyl benzene sulphonate, butyl naphthalene sulphonate, a calcium lignosulphonate, sodium lignosulphonate, ammonium lignosulphonate and glue. An alternative way of making the liquid preparation comprises dissolving the composition in an organic solvent, for example benzene, or a lower aliphatic alcohol, e.g., butanol, methanol, ethanol and then agitating the solution with water containing the surfactant.

The compositions are conveniently made available by a supplier in the form of concentrate which is a composition containing a high proportion of nematicidally active ingredient and which therefore is generally required to be diluted usually with water before application. Concentrates are also required to withstand storage for prolonged periods and after a period of storage to be capable of dilution easily to form liquid preparations which remain homogenous for a sufficient time to enable them to be applied by conventional spray equipment. The concentrates may contain from 10–85% by weight of the composition although for practical purposes from 25–60% by weight is usually preferred. An especially satisfactory form of concentrate comprises a concentrated solution of the composition in an organic solvent containing a surfactant which is soluble in the solvent. Since both nematicidally active substances are liquid under ordinary conditions concentrates containing even higher proportions of active ingredient may be obtained simply by dissolving a surfactant in the liquid mixture.

The rate at which the active ingredient is applied according to the present invention naturally depends to a large extent upon its activity towards the nematode to be controlled, the species of plant concerned and the nature of the formulation containing it. For example, where the active ingredient is applied by incorporation in the soil the rate can be, for example, from 0.005% to 0.01% by weight of the soil, i.e., from 5 to 100 parts per million (p.p.m.). As shown in Example I of this specification, in tests against Meloidogyne incognita on tomato plants it has been found very effective to use an amount of 6 and 12 p.p.m. by weight of the soil.

The compositions may be applied by conventional means, e.g., by dusting or spraying depending upon whether they are solid or liquid. In general better results are obtained if the ground infested by nematodes is penetrated by the composition sufficiently far for at least a major proportion of the root system of a plant growing in the ground to make contact with the nematicidally active mixture. Methods of application of liquids should therefore enable thorough drenching of the ground to be effected. Compositions may also be in the form of granules which may be introduced into the ground using equipment used for sowing seed. Advantage may also be derived when growing certain crops actually to mix the granules with seed and then to sow the mixture together. In certain instances it may be convenient to treat plants simply by dipping their roots into a formulation. This technique is generally of greater practical value in the treatment of plants growing in greenhouses.

The invention is illustrated by the following examples.

*Example I*

This example illustrates the nematicidal effect of a mixture of 1,2 - dibromo-3-chloropropane and dimethyl(3-methyl-4-nitrophenyl)phosphorothionate when applied to soil in the form of an emulsifiable solution. The emulsifiable solution used in this example as the test composition was one having the following constitution:

| | Percent by weight |
|---|---|
| Dimethyl(3-methyl - 4 - nitrophenyl)phosphorothionate | 1.0 |
| 1,2-dibromo-3-chloropropane | 1.0 |
| Polyethylene glycol | 91.0 |
| Emulsifying agent | 6.5 |
| Xylene | 0.5 |
| | 100.0 |

The polyethylene glycol used was one having a molecular weight of about 200.

This composition was tested against the root-knot eelworm Meloidogyne incognita on tomato plants as follows:

Test tomato plants were planted in pots containing soil infected with M. incognita. An aqueous emulsion of the test composition was then poured on to the soil around the roots of two potted test plants, the volume and concentration of the emulsion being chosen so that the amount of active ingredient applied to each plant was 0.0012% (12 parts per million) by weight of the soil in each of the pots and the volume of the emulsion was just sufficient to wet the soil in each pot. A second pair of plants was similarly treated with a second aqueous emulsion of a concentration such that the amount of active ingredient applied to the soil was 0.0006% (6 parts per million) by weight of the soil. Further pairs of tomato plants were similarly treated at the same time at rates of 12 and 6 parts per million with the separate compounds dimethyl(3-methyl - 4 - nitrophenyl)phosphorothionate and 1,2-dibromo-3-chloropropane. An untreated pair of plants was used as a control.

Fourteen days after treatment all the treated and control tomato plants were removed from their pots, their roots washed free from soil and the number of root knots on each plant was counted. The results thus obtained are set out in the following table.

| Nematicide | Amount of nematicide (p.p.m. in the soil) | Numbers of knots per plant | | |
|---|---|---|---|---|
| Control | — | 516 | 386 | 293 |
| 1,2-Dibromo-3-chloropropane | 6 | 37 | 40 | 26 |
|  | 12 | 23 | 15 | 15 |
| Dimethyl(3-methyl-4-nitrophenyl) phosphorothionate | 6 | 17 | 19 | 8 |
|  | 12 | 15 | 13 | 7 |
| Mixture of 1,2-dibromo-3-chloropropane and dimethyl(3-methyl-4-nitrophenyl)phosphorothionate (equal parts) | 6 | 5 | 5 | 2 |
|  | 12 | 2 | 0 | 0 |

It will be seen from the table that the nematicidal effect of the mixture of 1,2-dibromo-3-chloropropane and dimethyl(3-methyl - 4 - nitrophenyl)phosphorothionate used at the rate of 6 p.p.m. was considerably greater than the effect of 1,2-dibromo-3-chloropropane alone when used at the rate of 12 p.p.m.

*Example II*

Nematicidally active granules were obtained by spraying pellets of attaclay having an average diameter of 2–4 mm. with a composition consisting of equal parts by weight of 1,2-dichloro-3-chloropropane and dimethyl(3-methyl-4-nitrophenyl)phosphorothionate until the treated granules contained 5% by weight of the composition.

What I claim is:

1. A method of obtaining greatly enhanced nematocidal activity against the root-knot eel worm *Meloidogyne incognita* on tomato plants and other plant-parasitic species of soil dwelling nematodes infesting the root systems of plants, and nearby ground intended for growing plants, which consists essentially of the step of contacting the loci of infestation of said nematodes with from 5 to 100 parts per million by weight of the soil of a mixture of
    (a) 1,2-dibromo-3-chloropropane
    (b) dimethyl(3-methyl - 4 - nitrophenyl)phosphorothionate,
said mixture having a 5:1 to 1:5 ratio by weight of (a) to (b), until the resultant enhanced nematocidal effect obtained by said mixture exceeds the nematocidal effect obtained by employing (a) and (b) alone in corresponding amounts.

2. A nematocidal composition comprising a mixture of:
    (a) 1,2-dibromo-3-chloropropane
    (b) dimethyl(3-methyl - 4 - nitrophenyl)phosphorothionate,
said mixture having a 5:1 to 1:5 ratio by weight of (a) to (b).

3. A composition according to claim 2 containing a diluent.

4. A composition according to claim 2 containing a surfactant.

5. A composition according to claim 4 wherein the surfactant is a condensation production of ethylene oxide.

6. A composition according to claim 2 containing an organic solvent.

7. A composition according to claim 6 wherein the solvent is selected from the class consisting of benzene and lower aliphatic alcohols.

8. A composition according to claim 2 containing 10–85% by weight of the mixture.

References Cited by the Examiner

UNITED STATES PATENTS

| 2,937,936 | 5/60 | Schmidt | 71—2.7 |
| 3,049,472 | 8/62 | Swezey | 167—39 |
| 3,085,044 | 4/63 | Chupp et al. | 167—30 |
| 3,091,565 | 5/63 | Suzuki et al. | 167—30 |
| 3,131,120 | 4/64 | Chupp et al. | 167—30 |

OTHER REFERENCES

Chem. Abstracts, 55: 9768g, 2393ac, 27750g (1961).
Chem. Abstracts, 56: 2734g (1962).

LEWIS GOTTS, *Primary Examiner.*